United States Patent [19]

Hold et al.

[11] 4,213,710
[45] Jul. 22, 1980

[54] ADJUSTABLE HOMOGENIZATION EXTRUDER

[75] Inventors: Peter Hold, Milford, Conn.; Zehev Tadmor, Teaneck, N.J.; Hans R. Scharer, Woodbridge, Conn.

[73] Assignee: USM Corporation, Farmington, Conn.

[21] Appl. No.: 946,093

[22] Filed: Sep. 26, 1978

[51] Int. Cl.² ............................................. B29F 3/02
[52] U.S. Cl. ..................................... 366/81; 366/319;
425/207; 425/208; 425/209
[58] Field of Search ...................... 425/207, 208, 209;
366/79, 81, 319

[56] References Cited

U.S. PATENT DOCUMENTS 2,518,124  8/1950  Corbett ............................... 425/208

FOREIGN PATENT DOCUMENTS 1083535  6/1960  Fed. Rep. of Germany ........... 425/207
2405693  6/1975  Fed. Rep. of Germany ........... 425/208

Primary Examiner—James H. Derrington
Attorney, Agent, or Firm—Donald N. Halgren; Richard B. Megley; Vincent A. White

[57] ABSTRACT

An extruder machine for processing thermoplastic materials such as low density polyethylene, the extruder incorporating a body having a bore therethrough with a rotor or screw journalled therein. The rotor has several successive mixing and pumping sections. The mixing sections on the rotor are multiple flighted defining primary and secondary channels having their discharge and entrances respectively blocked or restricted by annular dam arrangements. The rotor includes a plurality of adjustable dams, arranged across the channels, permitting a variation in the degree of homogenization which may be performed upon the extrudite. The dams may be radially displaceable to vary the distance between the radially outer surface of the dam and the surface of the bore.

8 Claims, 3 Drawing Figures

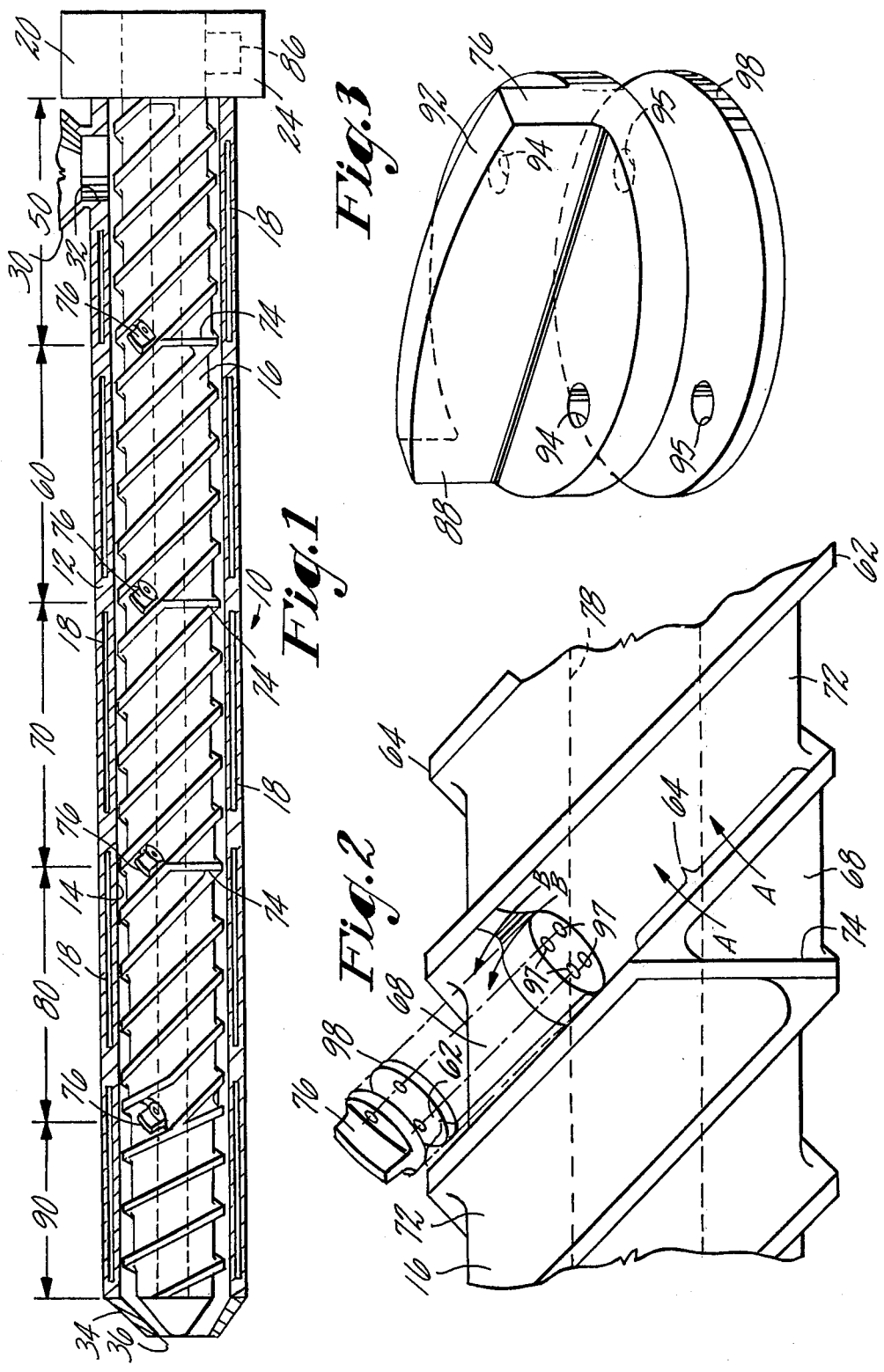

ADJUSTABLE HOMOGENIZATION EXTRUDER

BACKGROUND OF THE INVENTION

1. Field of the Invention

This invention relates to thermoplastic extrusion machines, and more particularly to flow restrictions arranged about the rotor in the bore of such an extrusion machine.

2. Prior Art

Physical and optical properties of low density polyethylene are improved by mechanical shearing of the molten material. Additives such as processing aids, stabilizers and coloring agents are usually put in the material during the mechanical shearing processing. Historically this mechanical shearing has been done in the intensive mixers or in cold feed extruders by remelting material through the application of mechanical shear forces. Since this material is originally produced as a hot molten liquid, this remelting process involves intermediate pelletizing, cooling and drying steps in the originally produced material.

A variety of attempts have been made in the past to increase the capabilities of extruder machines or to increase the amount of work put into the thermoplastic material in the extruder machine. These attempts have included multi-flighted extrusion screws, or rotors, having primary and secondary channels associated therewith. The rotor would be divided into a plurality of sections, for feeding, homogenizing, and pumping the extrudite therealong. One or more of the channels in one or more of the sections in the rotor, might have a stationary dam to provide back pressure to the thermoplastic material being worked through the extruding machine between the outside diameter of the rotor and the inside diameter of the bore disposed about the rotor. A machine of this type is shown in U.S. Pat. Nos. 3,411,179 to Gregory et al, and 3,850,414 (now disclaimed) to Scharer.

The shearing action of these machines is improved by the back pressure created by the dams across the channels in the rotors. However, some types of low density polyethylene may require either more or less back pressure (which governs the degree of homogenization in the polyethylene), than other types of low density polyethylene.

A recent improvement in this field is shown in U.S. Pat. No. 4,152,077 issued May 1, 1979, which is assigned to the assignee of the present invention, and which discloses an axially displaceable rotor arranged in a bore which has annular grooves therein. The rotor is longitudinally displaceable to align its dams with the annular grooves in the bore to vary the degree of homogenization and mixing intensity produced by the rotor.

It is therefore an object of the present invention to provide a homogenizing extrusion machine with improved capabilities to extrude a variety of thermoplastic materials, including low density polyethylene by being able to vary or eliminate the homogenization or mixing therewithin.

SUMMARY OF THE INVENTION

The present invention relates to an extruder machine for working thermoplastic material, such as low density polyethylene, to improve the physical and optical properties thereof. The extruder machine includes a body having a longitudinal bore extending therethrough. Disposed at either end of the bore is an opening for feeding and discharging the thermoplastic material worked through. A rotor is journalled within the bore. The rotor has a plurality of helical lands arranged therearound called flights. The flights effect the movement and the working of the material therethrough. The rotor body comprises a plurality of functional sections for feeding, mixing, and causing a mechanical shear within the material. A plurality of ringlike restrictions are generally annularly arranged and are spaced between certain flights to provide a back pressure and hence more mixing to the material being worked.

The rotor also has a plurality of adjustable dams arranged between certain adjacent flights to permit variability in the degree of homogenization performed on the material. The dams may be moved radially inwardly or radially outwardly of the rotor axis, thus permitting an easily adjustable variation in the distance from the radially outer surface of the dam, to the surface of the bore. That is, they permit a variation in the processing of one or several types of thermoplastic material, while not requiring major machine overhaul or re-work between successive extrudite production runs. The structure of the bore and its adaptation with radially adjustable dams, permits a wide variation in plastic processing capabilities.

BRIEF DESCRIPTION OF THE DRAWINGS

The objects and advantages of the present invention will become more apparent when viewed in conjunction with the following drawings in which:

FIG. 1 is an elevational view, partly in section, of an extruder machine constructed according to the principles of the present invention;

FIG. 2 is an enlarged exploded view of a portion of FIG. 1; and

FIG. 3 is a perspective view of an adjustable dam.

DESCRIPTION OF THE PREFERRED EMBODIMENTS

Referring now to the drawings, and particularly to FIG. 1, there is shown an extruder machine 10. The extruder machine 10 includes a main body portion 12 having a bore 14 extending longitudinally therethrough. A screw or rotor 16 is rotatively journalled within the bore 14. The body portion 12 also includes heat transfer fluid flow paths 18 adjacent the bore 14 to maximize heat transfer therebetween.

The rotor 16 is adapted to be driven through a motor 20 and a gearing arrangement 24. A hopper 30 disposed on the feed end of the main body portion 12 communicates with the bore 14 through a feed opening 32. Material deposited in the hopper 30 is caused to fall into the bore 14, to be advanced through the bore 14 by the rotor 16, to an extruder head 34 which generally includes a discharge opening 36 to discharge the worked material to a receiving apparatus, not shown.

The main body portion 12 and rotor 16 of the extruder machine 10 are comprised of a plurality of individual sections, which in this example, may include a feeding and homogenizing (mixing) section 50, a homogenizing (mixing) section 60, another homogenizing (mixing) section 70, yet another homogenizing (mixing) section 80, and a final pumping section 90. The individual sections are each generally segregated from one another by an annular ring 74, as will be described below. The initial feeding and homogenizing section 50 generally includes that portion of the body 12 and rotor 16 which extend from the rearmost portion of the rotor 16 and body 12 to a point in the bore 14 substantially forward of the feed hopper 30. The rotor 16 is adapted with one or more primary flights 52, and one or more secondary flights 54, which spiral coextensively with the rotor 16, through the feeding, mixing, and pumping sections thereof. The primary flights in one section in their continuity may comprise the secondary flights in an adjacent section. The rotor 16 and the flights have a function to receive material placed in the feed hopper 30 such as molten or semi-molten thermoplastic material, e.g. polyethylene, to mix it and pump it forwardly into the downstream homogenizing sections 60, 70 and 80, of the extruder machine 12, whereupon it is similarly worked as recited in the above-mentioned U.S. Pat. Nos. 3,850,414 and 4,152,077, and which are incorporated herein by reference.

The downstream homogenizing (mixing) sections 60, 70 and 80 each contain at least one pair of flights, generally two to four pairs of flights are preferred, however, and two pairs are shown in FIG. 2, the primary flights being designated 62, and the secondary flights being designated 64. The primary and secondary flights 62 and 64 define alternating primary and secondary channels 68 and 72 between one another. A primary channel 68 may downstream and past certain restrictions, become a secondary channel 72. As the material travels longitudinally through the bore 14, it is caused to enter, for example, one of the primary channels 68. Pressure generated within the thermoplastic material in that channel 68, is for all practical purposes, blocked off at the end of that particular section, by the generally annular ring 74. The ring 74 may have at least one adjustable dam 76 adaptably secured in a hole 96, and may be spaced in a position where it may at least partially block and define the end of a particular secondary channel 72 on the rotor 16, permitting the flow of material in that secondary channel 72 to pass in a throttling manner thereacross into a primary channel 68. The dam 76 defining the end of the secondary channel 72 at the annular ring 74 is shown in FIG. 2 in an exploded view. The drag of the secondary flight 64 adjacent that secondary channel 72 and the pressure differential between the primary channel 68 and the secondary channel 72 causes the extrudite material to flow over the secondary flight 64. The material that flows from the secondary channel 72, over the adjustable dam 76, and into its contiguous channel 68 flows into a primary channel. The material flows, therefore, over the flight 64 as shown by the arrows A, in FIG. 2, which divides the primary and secondary channels 68 and 72 and then over the (exploded view of the) adjustable dam as shown by the arrows B. The secondary flight 64 between the two channels has a larger clearance between it and the walls of the bore 14, than between the annular ring 74 or the primary flight 62 and the walls of the bore 14.

The amount of shear strain necessary to homogenize the material being worked (e.g. low density polyethylene), determines the particular number of flights and hence the number of channels and homogenizing sections required in the rotor 16. The amount of shear strain which can be imparted to the material in any one homogenizing section 60, 70 or 80, is limited by the capability of the heat transfer flow paths 18 in causing sufficient cooling therewith. The heat transfer between the thermoplastic material being worked, and the cooling medium flowing in the heat transfer flow paths 18, is improved by utilizing a rotor 16 with at least two to four pairs of flights generally helically disposed therearound, as aforementioned, to increase the frequency that the wall of the bore 14 is scraped of material.

The shear rate, the rate at which the material is deformable by shearing, depends upon the geometry of the rotor 16, the speed of the rotor 16, the back pressure caused by the adjustable dams 76 at the boundaries of each homogenizing section. The size of the clearance outwardly of the dam 76 can be computed to establish an equilibrium between the cooling capacity (heat transfer capabilities) and the work input (shearing action) in the material to permit optimization thereof. The clearance between the flight 64 intermediate the primary channel 68 and the secondary channel 72 has an effect upon the material as it traverses thereacross in the homogenizing sections. The depths of the primary channels 68 and the secondary channels 72 may be different, to cause the exchange of material between the channels to be even further improved. However, in manufacturing polymers such as low density polyethylene, complete homogenization may not be desirable or necessary. To this end, the rotor 16 may have a plurality of the aforementioned adjustable dams 76, between adjacent flights, or in a gap in one of the annular rings 74, or in a gap in a particular flight, however, only one adjustable dam 76 is shown in FIG. 2, the adjustable dams 76 permitting a wide variation in the mixing and homogenizing capabilities of the extruder machine 10. The adjustable dams 76, in a side view, appear as an inverted T.

An adjustable dam 76, is shown in a perspective view in FIG. 3, comprising a base 84, which may preferably be circular, for ease in manufacture. A flange 88, which actually comprises the "dam", extends across the base 84 and is generally perpendicular to it. The flange 88 may have a curvilinear top surface 82, which is the radially outermost surface of the adjustable dam 76 when it is mounted on the rotor 16. The base 84 may have at least one pair of bolt holes 94 arranged therewith, through which fasteners, such as bolts, or the like, extend. A shim 98, as shown in FIG. 3, may be arranged beneath an adjustable dam 76. Each shim 98 may have at least one pair of bolt holes 95 which correspond to the bolt holes 94 in the base 84 of the adjustable dam 76. Each adjustable dam 76 is disposed in the hole or opening 96 in the rotor 16. The radially innermost ends of the openings 96 may have one or more tapped holes, 97 as shown in FIG. 2, which will accommodate the bolts which secure the dam 76 thereto. The adjustable dams 76 may be adjusted by removing the bolts which securedly extend through the base 84 into the tapped bores, by adding or removing one or more shim 98, as is required, to radially extend the upper surface 92 of the adjustable 76 away from the axis of the rotor 16. The adjustable dams 76 may be rotated in a "screwlike" fashion, about a radially directed axis, with respect to the axis of the rotor 16, to provide other ways of varying the degree of homogeneity effected upon the extrudite. Each shim 98 may have the same general configuration as the opening 96 in which they are disposed in the rotor 16 to permit simple adjustment of the adjustable dam 76.

The adjustable dams 76, may be reached through an arrangement of resealable ports, not shown, which extend through the wall of the main body portion 12, or the rotor itself may be withdrawn from the bore 14 to permit access to the adjustable dams 76. Alternative arrangements for effecting adjustment, that is, radial or rotative movement, of the dams 76, include a mechanical linkage which may extend through a central channel 78 which may extend through the rotor 16, to the radially inner ends of the adjustable dams 76, permitting remote controlled movement of the dam 76 without requiring excessive effectuating effort.

Highly viscous material, which for some products do not require any homogenization can be manufactured in the extruder machine with the adjustable dam 76 completely removed, and replaced with just a plurality of shims 98 to permit a smoother path of travel of extrudite. It is also possible to adapte the present adjustable dam 76 to the concept disclosed in the aforementioned U.S. Pat. No. 4,152,077, with the axially adjustable rotor and the bore with its annular channels therearound, for a more complete control of homogenization.

Thus, there has been shown an efficient extruding machine for varying the amount of homogenization of thermoplastics worked therethrough. That by arranging a radially adjustable dam in the rotor of an extrusion machine to have certain distances between the dam and the walls of the bore or by rotating the dam to change the blockage to flow of extrudite in the channels thereby providing controlled restrictions to passage of material therepase, producing an extrusion machine with the ability to controllably mix and extrudite a wide variety of thermoplastics in a very economical and efficient fashion.

We claim:

1. An extruder machine for the processing of thermoplastic material comprising:
   a body having a bore extending longitudinally therethrough;
   a rotor having at least one helically arranged flight disposed therearound, said rotor being rotatively journalled about an axis in said bore;
   a feed opening in one end of said body to permit material to be worked to be deposited therein, said feed opening being in communication with said bore;
   a discharge opening in the other end of said body to permit material worked therein to be extruded therethrough; and
   an adjustable dam arranged on said rotor and movable in the radial direction with respect to the axis of said rotor and rotatable about its own radially directed axis to permit the regulation of flow of said thermoplastic material therewith.

2. An extruder machine for the processing of thermoplastic material, as recited in claim 1, wherein said adjustable dam is movably arranged in a gap along one of said flights.

3. An extruder machine for the processing of thermoplastic material, as recited in claim 2, wherein said adjustable dam is securably arranged by a holding means in an opening in said rotor.

4. An extruder machine for the processing of thermoplastic material, as recited in claim 3, wherein said adjustable dam is radially displaceable with respect to the axis of said rotor by adjusting said holding means after adapting a shim therewith.

5. An extruder machine for the processing of thermoplastic material as recited in claim 4, wherein said holding means comprises at least one bolt which is arranged through said adjustable dam and into said opening in said rotor.

6. An extruder machine for the processing of thermoplastic material as recited in claim 4, wherein said adjustable dam is displaceable away from the axis of said rotor by loosening said holding means and inserting at least one shim radially inwardly of said adjustable dam in said opening in said rotor.

7. An extruder machine for the processing of thermoplastic material as recited in claim 4, wherein said adjustable dam is displaceable towards the axis of said rotor by loosening said holding means and removing at least one shim from said opening in said rotor, and thereupon by tightening said holding means against said adjustable dam to displace it towards said axis.

8. An extruder machine for the processing of thermoplastic material as recited in claim 4, wherein said adjustable dam has a radially outermost surface which is of curvilinear configuration to correspond generally to the contour of said bore.

* * * * *